United States Patent
Takeda et al.

(10) Patent No.: US 6,289,256 B1
(45) Date of Patent: Sep. 11, 2001

(54) METHOD AND APPARATUS FOR MOUNTING PARTS

(75) Inventors: Takeshi Takeda, Osaka-fu; Yoshihiro Mimura, Izumi; Noriaki Yoshida, Ikeda; Akira Kabeshita, Hirakata, all of (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/008,611

(22) Filed: Jan. 15, 1998

(30) Foreign Application Priority Data

Jan. 16, 1997 (JP) .................................................. 9-005342

(51) Int. Cl.⁷ .................................................. G06F 19/00
(52) U.S. Cl. ............................................ 700/121; 29/740
(58) Field of Search .................................. 700/95, 56–59, 700/61–63, 121, 302, 213, 69, 188, 170; 29/740

(56) References Cited

U.S. PATENT DOCUMENTS

| | | | |
|---|---|---|---|
| 4,135,630 | * 1/1979 | Snyder et al. ........................ | 414/627 |
| 4,237,408 | * 12/1980 | Frecka .................................. | 318/571 |
| 4,876,791 | * 10/1989 | Michaud et al. ........................ | 29/840 |
| 5,004,968 | * 4/1991 | Mizuno et al. .......................... | 700/69 |
| 5,010,474 | * 4/1991 | Tsuruta et al. .......................... | 700/57 |
| 5,011,345 | * 4/1991 | Nishigai et al. ....................... | 409/132 |
| 5,040,291 | * 8/1991 | Janisiewicz et al. ................... | 29/840 |
| 5,142,210 | * 8/1992 | Kojima et al. ........................ | 318/566 |
| 5,214,362 | * 5/1993 | Torii et al. ............................ | 318/567 |
| 5,587,915 | * 12/1996 | Nagatomi ............................. | 700/186 |
| 5,758,410 | * 6/1998 | Asai et al. .......................... | 362/153.1 |

\* cited by examiner

Primary Examiner—William Grant
Assistant Examiner—Edward F. Gain, Jr.
(74) Attorney, Agent, or Firm—Wenderoth, Lind & Ponack, L.L.P.

(57) ABSTRACT

A control device controls to move a chucking mechanism part to a first stop height 451 at a first speed, then at a second speed lower than the first speed before the chucking mechanism part comes in touch with a part from the first stop height, and stop when the chucking mechanism part touches the part, thereby to hold the part. So, a shock to the part when the part is held is reduced in the constitution, and the apparatus becomes light-weight because of the elimination of a shock-absorbing mechanism, hence realizing high-speed mounting.

14 Claims, 6 Drawing Sheets

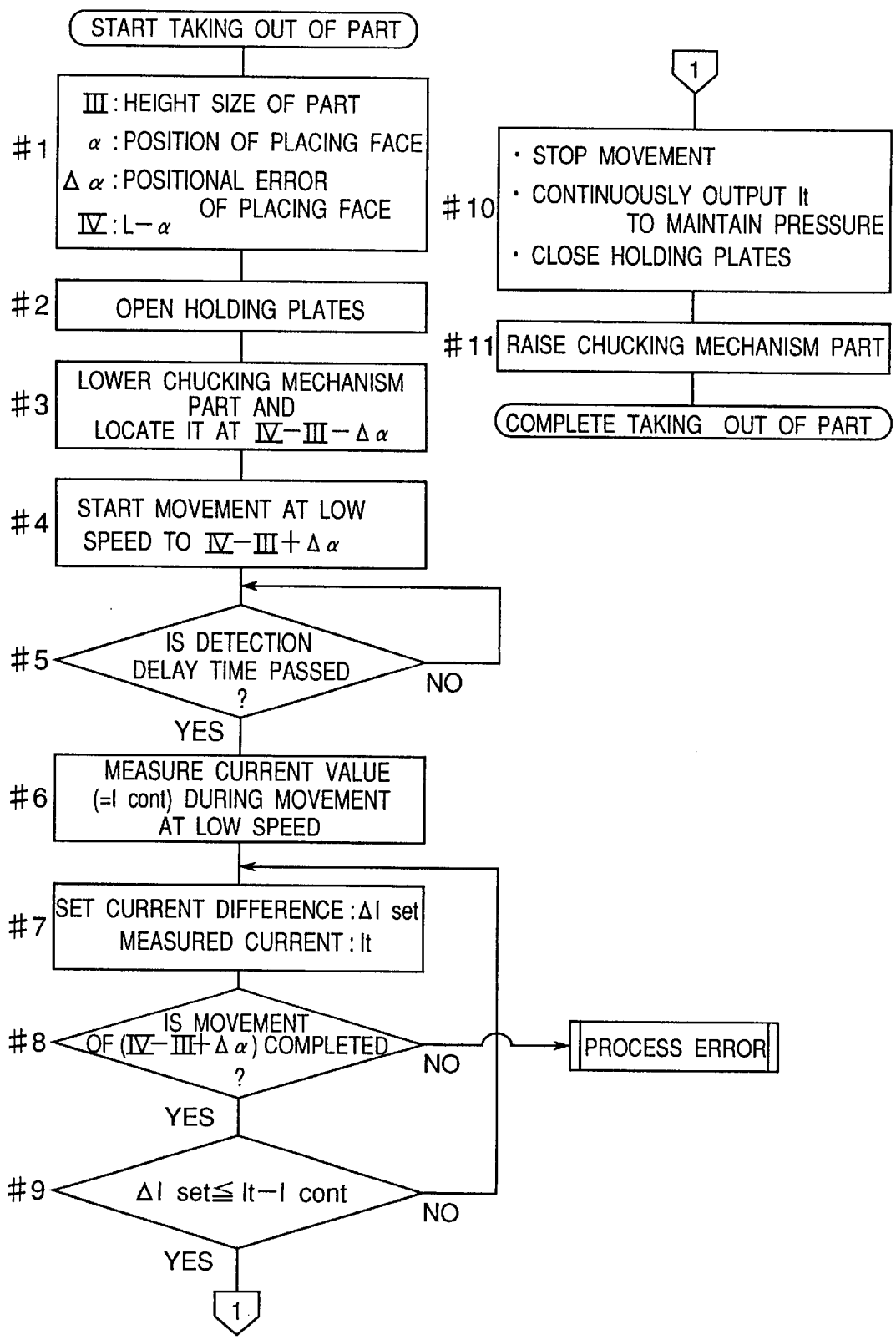

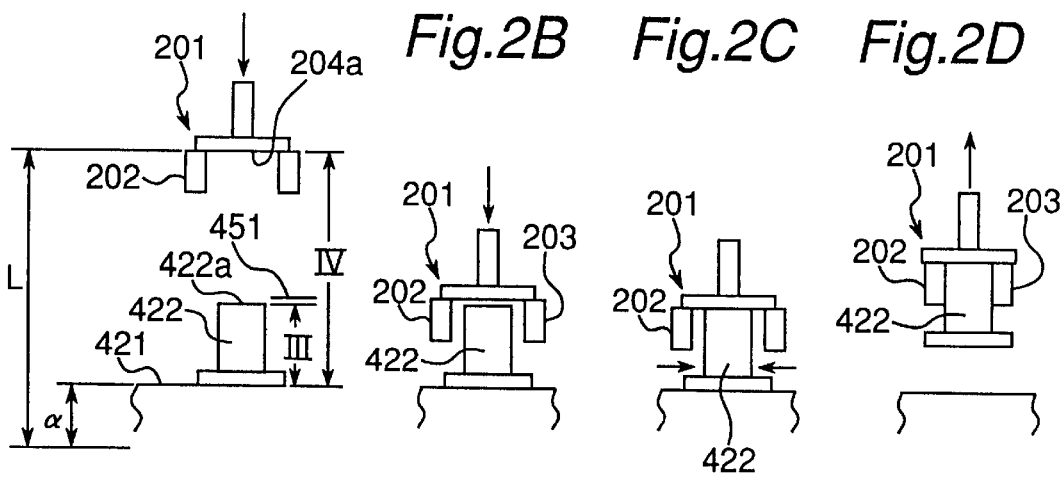
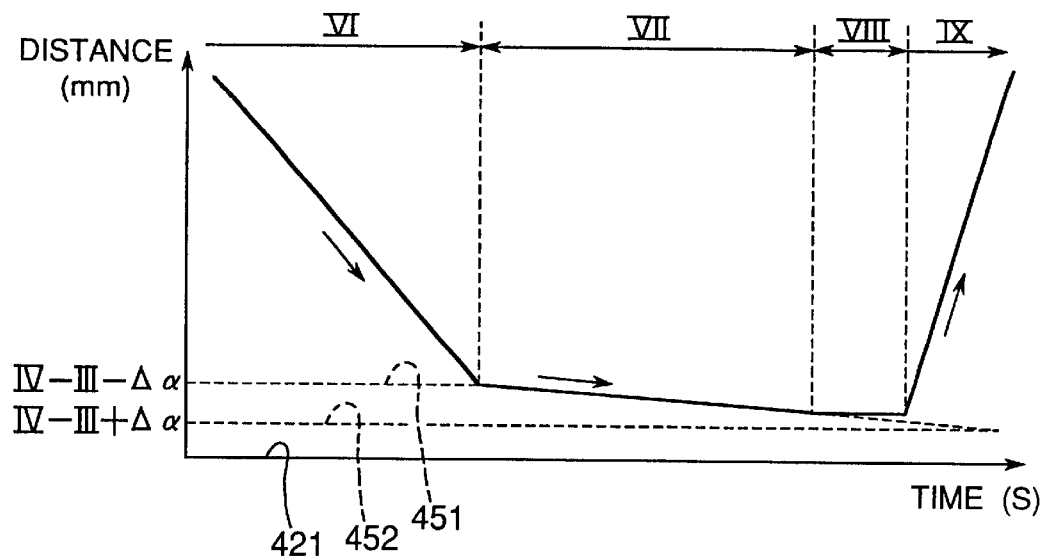

METHOD AND APPARATUS FOR MOUNTING PARTS

BACKGROUND OF THE INVENTION

The present invention relates to a method for mounting, for instance, electronic parts onto circuit boards, and a part-mounting apparatus executing the method.

High accuracy and high productivity have been demanded in recent part-mounting apparatuses for mounting, age e.g., electronic parts onto circuit boards. For instance, a part-mounting apparatus of a multi-functional type has increased its market share, wherein a part transfer device (referred to as a head member hereinafter) taking out each electronic part from a part feed section and mounting it to a circuit board is moved by an XY robot which is freely movable in X, Y directions. In this type of the apparatus, parts can be supplied from the part feed section with a high degree of freedom in a feed state, a variety of parts can be handled and high accuracy of the mounting is secured because of a simple constitution, and accordingly furthermore development has been attempted with an aim for much higher speed and accuracy. In the meantime, besides the speed-up of mounting of parts by the adoption of a linear motor to the XY robot, a pressure of a part-sucking nozzle of the head member impressed to the parts has been controlled in a nozzle-driving mechanism of some apparatuses, thereby to adjust a mount pressure. Although a mechanism using a mechanically driving clutch has been a mainstream conventionally to take out the electronic parts from the part feed section and correct a posture of each held part simultaneously, the mechanism practically has demerits, that is, a complicated structure and an increased weight with impressing a high stress to the held part, etc. As such, in accordance with the progress of the image recognition technique, an air pressure is primarily utilized today to suck, take out, recognize and correct a position of the parts.

Parts to be mounted to circuit boards have become greatly complicate in shape consequent to the miniaturization of products with the circuit boards incorporated therein. As a result, some of the parts have no face to be able to be sucked by the nozzle. For coping with this, there is a part-mounting apparatus which includes a chucking mechanism with two holding plates moving in opposite directions to each other orthogonally to a thickness direction of the circuit board, wherein the posture of the part held by the holding plates is corrected through the image recognition technique.

A method for mounting parts which is carried out in the above-described part-mounting apparatus of the conventional art will be described with reference to the. drawings.

FIG. 8 is an example of a chucking device 200 set in the conventional part-mounting apparatus. The chucking device 200 generally consists of a chucking mechanism part 201 and a driving part 210 for moving the chucking mechanism part 201 in a thickness direction I of a circuit board. The chucking mechanism part 201 has two holding plates 202, 203 and an air pressure driving source 204 with, e.g., an air cylinder. The holding plates 202, 203 are movable in opposite directions II to each other orthogonally to the thickness direction I, and opened/closed by the driving source 204 to hold electronic parts. The driving part 210 and chucking mechanism part 201 are coupled via a spring 205 which absorbs shocks between the part and the chucking mechanism part 201 when the part is held by the chucking device 200 and between the part held by the chucking mechanism part 201 and the circuit board when the part is mounted to the circuit board.

The chucking device 200 in the above constitution is mounted to an XY robot as described earlier.

The method of mounting in the part-mounting apparatus having the above chucking device 200 will be specifically described below.

The chucking device 200 is moved by the XY robot to above a hold position of in the part feed section. The holding plates 202, 203 are opened by turning ON the air pressure driving source 204. At this time, the chucking device 200 recognizes an initial height IV of the part feed section from a placing face 421 and a height III of a held part 422 in the chucking mechanism part 201. The chucking mechanism part 201 is lowered by the driving part 210 a distance (IV–III) obtained by subtracting the height III from the initial height IV in a height direction of the part 422. A change in amount of the downward movement of the chucking mechanism part 201 as a result of a distortion of the placing face 421 or an error in the height III of the part 422 is absorbed by the spring 205. Thereafter, simultaneously with when the chucking mechanism part 201 is finished to move down or an operation delay time of the chucking mechanism part 201 earlier than the finish of the movement, the air pressure driving source 204 is turned OFF and the holding plates 202, 203 are closed thereby to hold the part 422. The driving part 210 raises the chucking mechanism part 201 concurrently when the part 422 is completely held. Taking out of the part 422 from the part feed section is completed in this manner. The chucking device 200 is then moved by the XY robot to a mount position on the circuit board, and the part 422 is mounted to the circuit board.

According to the conventional mount method as above, in the event that the initial height IV from the part placing face 421 in the chucking mechanism part 201 includes an error, for example, if the height IV in FIG. 9 is larger than a predetermined value, the chucking mechanism part 201 cannot hold the part 422 at a normal position, but holds the part 422 only at end portions of the holding plates 202, 203 at the side of the placing face 421, which gives rise to a gap V. In an extreme case, the chucking mechanism part 201 after holding the part 422 may drop the part 422 in the middle of transferring the part to the circuit board, or shift a posture of the part 422 when moving the part for the correction after the image recognition. In addition, the chucking mechanism part 201 is descended a total distance of an original fall distance and the gap V when mounting the part to the circuit board, and consequently impresses unnecessary impacts between the circuit board and part 422. On the other hand, if a fall position of the chucking mechanism part 201 to the part feed section is set to be closer to the part placing face 421 than an original position so as to avoid the unnecessary shocks when the part is mounted to the circuit board, the chucking mechanism part 201 in turn applies undesirable shocks to the part 422 when taking out the part 422.

The placing face 421 sometimes is considerably a fragile tray. As shown in FIG. 10, when the chucking mechanism part 201 applies a force to the part 422 unexpectedly from above when taking out the part 422, a part of the placing face 421 of a tray 423 is deformed, thereby bringing the part 422 into a greatly instable state. The part 422 in such instable state is highly possibly dropped or recognized wrong in any process of holding, image recognition, positional correction and mounting. Further, in such the fragile tray 423, the force acting to the part 422 may influence other parts on the same tray 423 to change an alignment of the other parts, forcing the other parts outside the tray 423 in the worst case.

SUMMARY OF THE INVENTION

The present invention is devised to solve the aforementioned problems and thus an object of the present invention is to provide a method and an apparatus for mounting parts at high speed with limiting impacts to the parts to minimum.

In accomplishing this object, according to first aspect of the present invention, there is provided a method for mounting a part to a body to be mounted by moving a part holding member in a height direction of the part thereby to hold the part and then mounting the held part to the body to be mounted, the method comprising:

moving the part holding member at a first speed to a part vicinal position which is noncontact to the part and spaced a total of a height size of the part and a contact avoid size that the part holding member is prevented from being in contact with the part;

moving the part holding member at a second speed lower than the first speed before the part holding member comes in contact with the part from the vicinal position;

stopping the part holding member when the part holding member comes in touch with the part; and holding the part by the part holding member after the part holding member is stopped to move.

According to second aspect of the present invention, there is provided an apparatus for mounting a part to a body to be mounted by moving a part holding member in a height direction of the part thereby to hold the part by the part holding member and then mounting the held part to the body to be mounted, the apparatus including a control device adapted to make a control so that:

the part holding member is moved at a first speed to a part vicinal position which is noncontact to the part and spaced a total of a height size of the part and contact avoid size that the part holding member is prevented from being in contact with the part;

the part holding member is moved at a second speed lower than the first speed before the part holding member comes in contact with the part from the vicinal position;

the part holding member is stopped when the part holding member comes in touch with the part; and the part is held by the part holding member after the part holding member is stopped to move.

According to the part mount method of the first aspect and the part mounting apparatus of the second aspect of the present invention, the control device moves the part holding member to the vicinal position at the first speed, then at the second speed lower than the first speed before the part holding member comes in touch with the part from the vicinal position, and stops when the part holding member touches the part. An impact acting to the part when the part holding member holds the part can thus be reduced. Moreover, the part can be held stably regardless of the error in set position of the placing face in the movement direction of the part holding member, irregularity in height size of the part in the movement direction of the part holding member and strength of the part feed section, etc. Owing to the above operation, a mechanism for absorbing the shock when the part holding member touches with the part is eliminated, so that the part holding member becomes light-weight and the part can be mounted at high speed.

BRIEF DESCRIPTION OF THE DRAWINGS

This and other objects and features of the present invention will become clear from the following description taken in conjunction with the preferred embodiment thereof with reference to the accompanying drawings, in which:

FIG. 1 is a flow chart of operations in a part mount method according to one embodiment of the present invention;

FIGS. 2A, 2B, 2C, and 2D are diagrams showing a sequence of take-out operations for a part by a chucking mechanism part in the method of FIG. 1;

FIG. 3 is a graph of a change of a distance between a part placing face and the chucking mechanism part with a lapse of time when the chucking mechanism part takes out the part from a part feed section in the method of FIG. 1;

DETAILED DESCRIPTION OF THE PREFERRED EMBODIMENT

Figure 8:
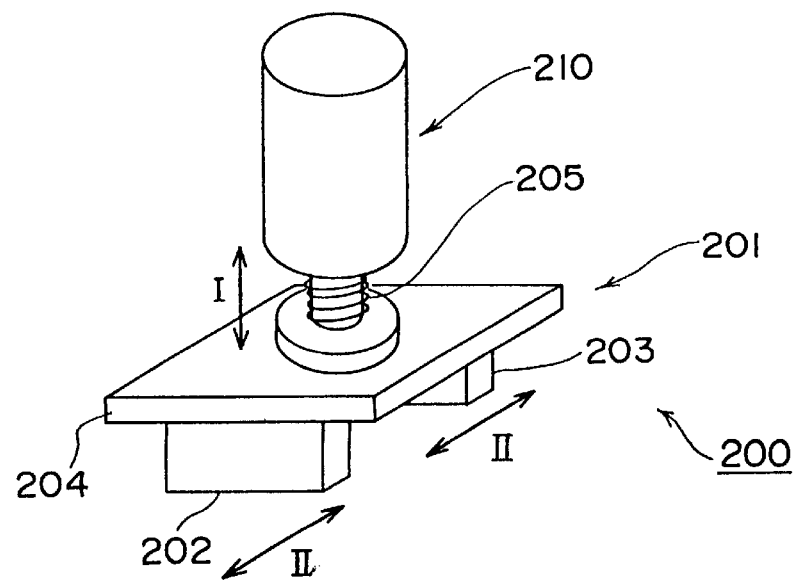
FIG. 8 is a perspective view of the constitution of a chucking device of a conventional part mounting apparatus.

A method and an apparatus for mounting parts according to one embodiment of the present invention will be described below with reference to the drawings. The part mount method is carried out by the part mounting apparatus. The components of the same constitution throughout the drawings including FIGS. 8–10 referred to earlier are designated by the same reference numerals.

The chucking mechanism part 201 corresponds to an embodiment functioning as a part holding member described in the SUMMARY OF THE INVENTION. Moreover, an electronic part is depicted as the part and the circuit board corresponds to an embodiment of a body to be mounted described in the SUMMARY OF THE INVENTION. A change width $\Delta\alpha$ embodies a contact avoid size and a first stop height 451 functions as an embodiment of a part vicinal position described in the SUMMARY OF THE INVENTION.

Figure 5:
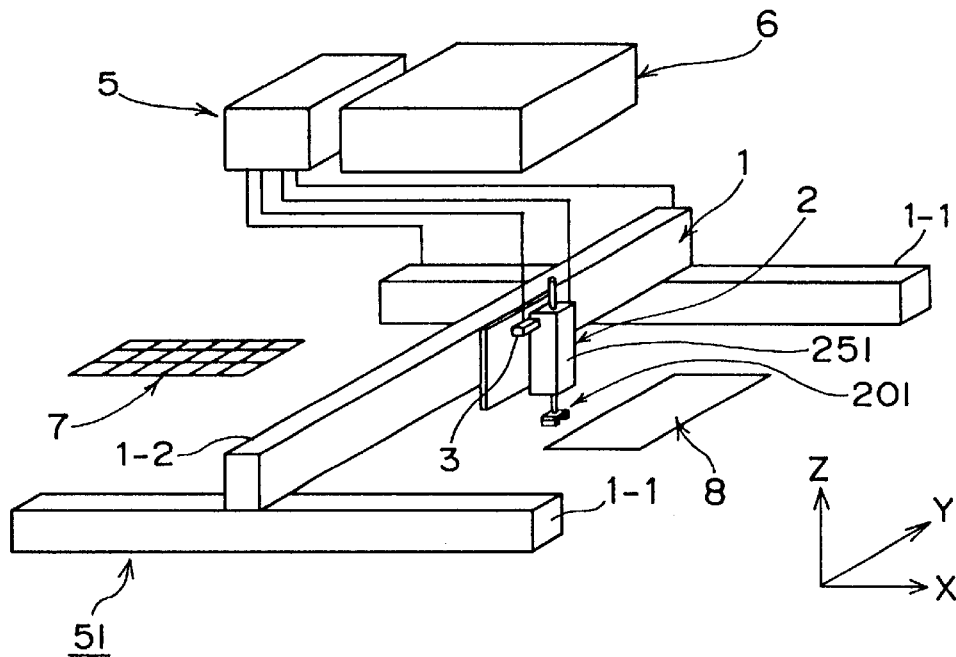
FIG. 5 is a perspective view schematically showing the constitution of a part mounting apparatus executing the method of FIG. 1.

In the first place, the constitution of a part mounting apparatus 51 according to the present embodiment will be described. As shown in FIG. 5, roughly speaking, the part mounting apparatus 51 is provided with a chucking device 2 having the chucking mechanism part 201 and a driving part 251, an XY robot 1 moving the chucking device 2 in horizontal X, Y directions, a chucking control device 5 controlling the chucking device 2, and a main control device 6 controlling the whole mounting apparatus 51. The XY robot 1 has two X guide parts 1-1, 1-1 extending in parallel to each other in, e.g., the X direction, and a Y guide part 1-2 extending in the Y direction orthogonal to the X direction and stretched over the X guide parts 1-1, 1-1. The chucking device 2 having the driving part 251 and chucking mechanism part 201 are set to the Y guide part 1-2. The chucking device 2 can accordingly be moved in the Y direction by the Y guide part 1-2, and can be moved also in the X direction through a movement of the Y guide part 1-2 along the X guide parts 1-1. In the present embodiment, a tray-type part feed section 7 storing various electronic parts and a circuit board 8 to which the electronic parts are mounted are arranged at a middle part between the X guide parts 1-1 and 1-1. The chucking device 2 is moved over the part feed section 7 and circuit board 8. The driving part 251 of the chucking device 2 of the embodiment moves the chucking mechanism part 201 in a Z direction orthogonal to both X and Y directions.

Figure 6:
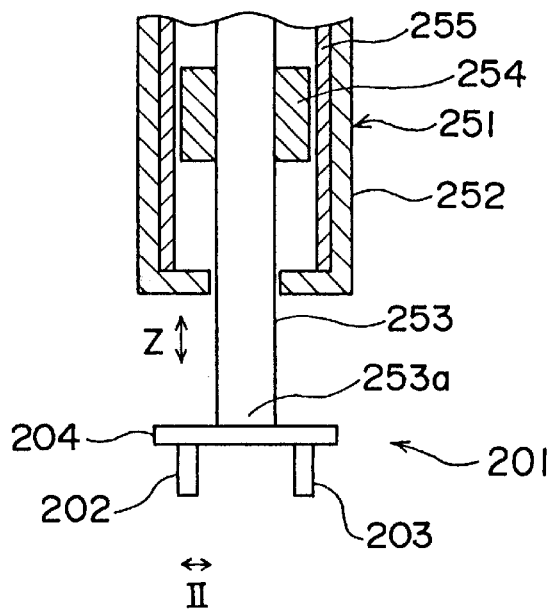
FIG. 6 is a sectional view showing the structure of the driving part of a chucking device of FIG. 5.

In the embodiment, the driving part 251 is constituted of a voice coil motor (VCM). More specifically, as shown in FIG. 6, the driving part 251 comprises a shaft 253 penetrating a casing 252 in the Z direction, a magnet 254 fixed in the circumference of the shaft 253 and a coil 255 set at an inner face of the casing 252 in a noncontact manner with a predetermined gap to the magnet 254 in an axial direction of the shaft 253. The chucking mechanism part 201 in the same structure as the conventional art is detachably fitted at one end part 253a of the shaft 253. The casing 252 is set to the Y guide part 1-2, and movable in the Y direction along the Y guide part 1-2. The amount of a current to the coil 255 of the driving part 251 constituted as above is controlled by the chucking control device 5, so that the shaft 253, namely, chucking mechanism part 201 can be moved in the Z direction to the Y guide part 1-2 while controlled in the amount of the movement. The controlling to the driving part 251 will be described in detail later.

The chucking device 2 is provided with a solenoid valve 3 which supplies and discharges air to an air pressure driving source 204 for opening and closing holding plates 202, 203 in the chucking mechanism part 201. The solenoid valve 3 is controlled by the chucking control device 5 to supply and discharge air.

By moving in the X, Y directions, the chucking device 2 holds an electronic part in the part feed section 7 and carries and mounts the part at a mount position of the circuit board 8.

The coil 255 is immobile and the magnet 254 is made movable in the voice coil motor of the driving part 251 according to the embodiment. Oppositely, the magnet 254 may be fixed to the inner face of the casing 252 and the coil 255 may be placed in the circumference of the shaft 253.

The part feed section 7 is not limited to the tray-type as in the present embodiment, alternatively, the part feed section can be a reel-type. In that case, the electronic parts are arranged in an extending direction on a tape which is wound to the reel-type part feed section.

The operation of the part mounting apparatus 51 will be described. In the present embodiment, a thickness direction of the circuit board 8, the above-mentioned Z-direction and a height direction of a part 422 all agree, and a placing face 421 in the part feed section 7 and a placing face 421 of the circuit board 8 are at the same position in the Z-direction for the sake of convenience.

As shown in FIG. 1, in step (indicated by "#" in FIG. 1) 1, the chucking control device 5 of the part mounting apparatus 51 receives information of a height size III of the electronic part 422 to be mounted to the circuit board 8, positional information α of the placing face 421 from a base position in the Z-direction, a change width Δα in the Z-direction of an upper face 422a of the part 422 putted on the placing face 421 which results from errors of the height size III and positional information α of the part placing face 421, as is clear from FIG. 2A. In the case where a plurality of kinds of electronic parts 422 are to be mounted, information of the height size III and change width Δα corresponding to each kind of the parts is supplied. The chucking mechanism part 201 is present at an initial position in the Z-direction before a mounting operation is started. The initial position is a height of "L" from the base position. Since information of the initial position of the chucking mechanism part 201 is memorized in the main control device 6 beforehand, the control device 6 calculates, when receiving the positional information α, an initial height size IV, i.e., a distance from the part placing face 421 to a lower face 204a of the air pressure driving source 204 in the chucking mechanism part 201 by subtracting the positional information α from the height of "L". Since the amount of a bend in the Z-direction of the XY robot 1 is set to be nearly 0, the amount of a change or shift in the Z-direction of the initial position of the chucking mechanism part 201 is neglected in the embodiment. However, the change amount of the initial position can be added to the change width Δα. A concept of the change width Δα as above is accordingly a size required to prevent the chucking mechanism part 201 from touching with the part 422 at a first speed which will be described later when the chucking mechanism part 201 holds the part 422.

In step 2, through the movement of the XY robot 1 under the control of the chucking control device 5, the chucking device 2 is sent to and arranged above the part 422 in the part feed section 7. After the arrangement of the chucking device 2 or simultaneously with the arrangement, the solenoid valve 3 is driven under the control of the chucking control device 5, thereby to open holding plates 202, 203 of the chucking mechanism part 201.

In step 3, based on the height size III, the change width Δα and the initial height size IV, the chucking control device 5 subtracts the height size III and the change width Δα from the initial height size IV, thereby to obtain a first fall distance. The chucking control device 5 preliminarily memorizes a relation of a value of the current fed to the voice coil motor of the driving part 251 and the amount of the movement of the chucking mechanism part 201 to a current feed time. Therefore, the amount of the movement of the chucking mechanism part 201 is controlled by the chucking control device 5 based on the current value and the current feed time.

The chucking control device 5 supplies the current to the driving part 251, so that the chucking mechanism part 201 is descended at the first speed by the first fall distance towards the part feed section 7 in the Z-direction from the initial position. The state at this time is shown in FIGS. 2A–2B and at a segment VI of FIG. 3. A position of the lower face 204a of the air pressure driving source 204 when the chucking mechanism part 201 is completely lowered by the first fall distance from the initial position is a first stop height 451 indicated in FIG. 3 and FIG. 2B.

In step 4, the chucking control device 5 subtracts the height size III from the initial height size IV, and adds the change width Δα, thereby to obtain a second fall distance. When the chucking mechanism part 201 is further descended by the second fall distance from the initial position, the lower face 204a of the air pressure driving source moves down by a distance twice the change width Δα from the first stop height 451, as shown in FIG. 3. A position of the lower face 204a of the air pressure driving source at the completion of the descent of the chucking mechanism part 201 is a second stop height 452 in FIG. 3. When the chucking mechanism part 201 moves from the first stop height 451 to the second stop height 452 and if the part 422 to be mounted is present at the part feed section 7, normally, the lower face 204a of the air pressure driving source touches with the upper face 422a of the part 422 in the middle of the descent of the chucking mechanism part 201. Even if a location of the part placing face 421 in the Z-direction is set at a maximum minus position within a plus or minus error range of the part placing face 421, wherein the maximum minus position is lower in a fall direction of the chucking mechanism part 201 than a regulated position, and the height size III of the part 422 is smaller than a regulated size in a maximum minus height size within an error range of the part 422, the lower face 204a of the air pressure driving source 204 touches with the upper face 422a of the part 422 when brought to the second stop height 452 subsequent to the downward movement of the chucking mechanism part 201.

If the chucking mechanism part 201 were lowered at the same speed as the first speed, the lower face 204a of the air pressure driving source 204 would impress a larger pressure to the part 422 at the time of touching with the upper face 422a of the part 422. Therefore, according to the embodiment, when the chucking mechanism part 201 is lowered from the first stop height 451 to the second stop height 452, the chucking control device 5 controls the amount of the current supplied to the driving part 251 so that the chucking mechanism part 201 is moved down at a second speed slower than the first speed as shown in a segment VII of FIG. 3.

Moreover, in order to detect the touching between the lower face 204a of the air pressure driving source 204 and the upper face 422a of the part 422, the chucking control device 5 detects a load of the driving part 251, specifically, the value of the current to the driving part 251. During the descent of the chucking mechanism part 201 from the first stop height 451 to the second stop height 452, the chucking control device 5 detects that the lower face 204a touches with the upper face 422a of the part 422 when the value of the current supplied to the driving part 251 suddenly increases and exceeds a threshold value, and then stops the descent of the chucking mechanism part 201.

Based on the control by the chucking control device 5 as above, in step 4, the chucking mechanism part 201 is controlled and lowered by the control device 5 from the first stop height 451 at the second speed.

Figure 4:
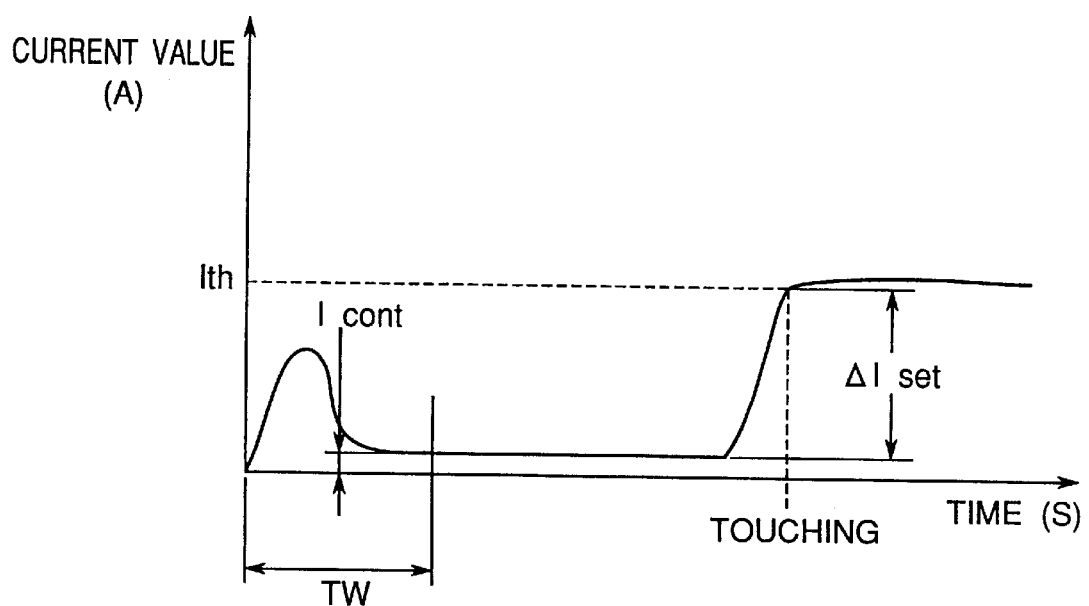
FIG. 4 is a graph of a change of a current fed to a driving part when the chucking mechanism part is driven at a second speed in the method of FIG. 1.

Immediately after the chucking mechanism part 201 starts to move in step 4, the current fed to the driving part 251 suddenly increases in a time interval "Tw" indicated in FIG. 4. For preventing the chucking control device 5 from recognizing wrong that the lower face 204a touches with the upper face 422a of the part 422 because of the increase of the current value at this time, a current stabilization time Tw is provided in step 5 to stabilize the current fed to the driving part 251 accelerating the chucking mechanism part 201 when the chucking mechanism part 201 is moved at the second speed. The chucking control device 5 judges the presence/absence of a lapse of the current stabilization time Tw. Also, the current stabilization time Tw is adjustable according to an accelerating speed of the chucking mechanism part 201.

In step 6 following step 5, when the current stabilization time Tw terminates, the chucking control device 5 measures a value "Icont" of the current fed to the driving part 251 when the chucking mechanism part 201 is moved at the second speed from the first stop height 451 to the second stop height 452.

As discussed hereinabove, the current to the driving part 251 suddenly increases after the lower face 204a of the air pressure driving source 204 touches with, the upper face 422a of the part 422. So, a value of the increased current at a time point when the lower face 204a of the air pressure driving source 204 is judged to touch, with the upper face 422a of the part 422 is set as "Ith". In step 7, the chucking control device 5 subtracts the current value Icont from the current value Ith, thereby to obtain a set current difference "ΔIset". In addition, the chucking control device 5 measures the current to the driving part 251 every moment, thereby to obtain a measured current value "It". In the case where the current value Icont and current value Ith are constant to any parts in each holding operation of the respective parts by the chucking mechanism part 201, as the set current difference ΔIset becomes constant, which may be stored in the chucking control device 5 beforehand.

The current value Ith is changeable on a control program of the chucking control device 5.

In step 8, the chucking control device 5 detects; whether or not the chucking mechanism part 201 reaches the second stop height 452. In other words, the chucking control device 5 judges whether or not the amount of the descent of the chucking mechanism part 201 from the initial position exceeds the second fall distance obtained in the aforementioned calculation. As described above, if the part 422 held by the chucking mechanism part 201 is present in the fall direction of the chucking mechanism part 201, the lower face 204a of the air pressure driving source 204 eventually touches with the upper face 422a of the part 422 during the downward movement of the chucking mechanism part 201 in the second fall distance from the initial position. In contrast, when the chucking mechanism part 201 is moved over the second fall distance, the chucking control device 5 judges that the part 422 to be held is not present, and carries out an error process.

Step 9 is started when the descent amount of the chucking mechanism part 201 is detected not to exceed the second fall distance in step 8. In step 9, the chucking control device 5 detects whether or not a value (It-Icont) obtained by subtracting the current value "Icont" from the measured current value "It" is not smaller than the set current difference "ΔIset". When the subtracted value (It-Icont) is smaller than the set current difference ΔIset, step 9 is returned to step 7, and steps 7–9 are repeated. On the other hand, when the subtracted value (It-Icont) is detected to be not smaller than the set current difference ΔIset, step 10 is performed.

In step 10, the chucking control device 5 controls, simultaneously with when the subtracted value (It-Icont) is detected not to be smaller than the set current difference ΔIset, the driving part 251 to stop the movement of the chucking mechanism part 201 to the second stop height 452. Even after the chucking mechanism part 201 is stopped to move, a torque generated by the voice coil motor constituting the driving part 251 is required to be maintained equally to that at the time when the faces 204a and 422a touch so as to keep the lower face 204a of the air pressure driving source 204 in tight contact with the upper face 422a of the part 422. Therefore, the chucking control device 5 continues to supply the current corresponding to the measured current value "It" to the driving part 251 even after the chucking mechanism part 201 is stopped. In this state, the chucking control device 5 drives the air pressure driving source 204 via the solenoid valve, 3 to move the holding plates 202, 203 in a direction to let the plates approach each other, that is, in a direction to close the holding plates 202, 203 thereby to hold the part 422.

The above state corresponds to FIG. 2C and a segment VIII of FIG. 3.

In step 11 subsequent to step 10, the chucking control device 5 raises the chucking mechanism part 201 to the initial position with holding the part 422 as indicated in FIG. 2D. A speed at this time is faster than the first speed as shown in a segment IX in FIG. 3.

Thereafter, similar to the conventional art, the XY robot 1 is driven to move the chucking device 201 to over the mount position of the circuit board 8, lower the chucking mechanism part 201 again and mount the held part 422 to the mount position of the circuit board 8.

Figure 9:
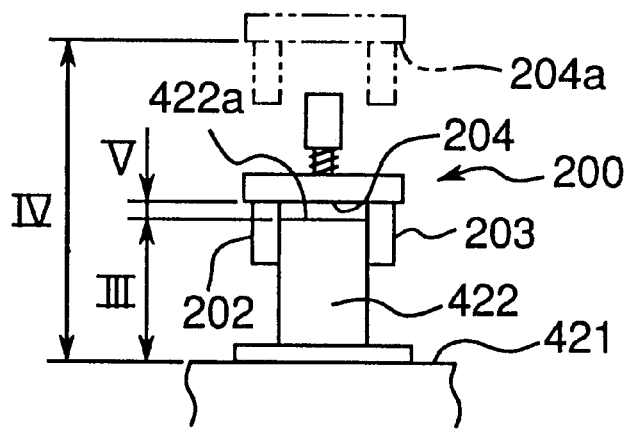
FIG. 9 is a diagram of a state when the chucking device of FIG. 8 holds a part.
Figure 10:
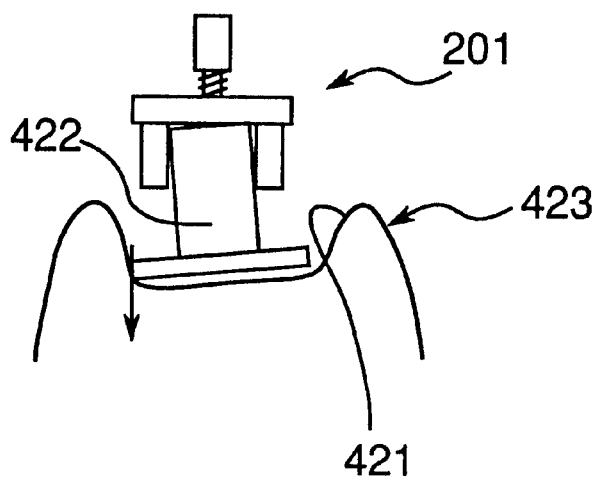
FIG. 10 is a diagram of a state when the chucking device of FIG. 8 holds a part in the case where a part placing face is fragile.

According to the embodiment, since the chucking mechanism part 201 holds the part 422 while the lower face 204a of the air pressure driving source 204 is kept always in touch with the upper face 422a of the part 422, a gap V as shown in FIG. 9 is never brought about. Therefore, the part 422 is not pressed to the circuit board 8 unexpectedly when mounted to the mount position and the speed of the descending chucking mechanism part 201 at the time of mounting the part 422 is maintained at the same speed as in the conventional apparatus.

The totally same kind of control is preferably executed as the above-described one when the part 422 is mounted to the mount position. That is, the contact or butting between the part 422 and the circuit board 8 is detected from a change of the current supplied to the driving part 251, similar to the above, thereby to open the holding parts 202, 203.

In the above-discussed method, a plurality of parts are mounted to the circuit board 8 by repeating operations from step 1 to step 11 when the kind of the part 422 to be mounted to the circuit board 8 is changed, or from step 2 to step 11 when the kind of the part 422 is not changed.

If a length of the holding plate 202, 203 in a height direction of the part 422 is larger than the height size III of the part 422 to be held, the gap V is undesirably brought about between the lower face 204a of the air pressure driving source 204 and the upper face 422a of the part 422. Therefore, a plurality of chucking mechanism parts 201 of different lengths of the holding plates 202, 203 are prepared to conform to the height size III of the part 422. Since information related to the part to be mounted is supplied beforehand to the chucking control device 5, the chucking control device 5 selects the chucking mechanism part 201 having the holding plates 202, 203 suitable to the part 422 to be mounted and automatically replaces the chucking mechanism part 201 at the one end part 253a of the shaft 253 with the selected chucking mechanism part 201.

As described hereinabove, in the method of the present embodiment, the change of the current of the voice coil motor of the driving part 251 which is caused when the lower face 204a of the air pressure driving source 204 actually touches with the upper face 422a of the part 422 is detected, based on which the holding plates 202, 203 of the chucking mechanism part 201 are opened/closed. The part 422 is accordingly stably held without being adversely influenced by errors in a set position of the placing face 421 in the direction of the movement of the chucking mechanism part 201, irregularities in the height size of the part 422 in the movement direction of the chucking mechanism part 201 and a strength of the tray 423 or the like of the part feed section 7, etc.

The threshold value Ith used in calculating the set current difference ΔIset described with reference to step 7 is easily changeable on the operation program of the chucking control device 5. Upon necessities, the threshold value may be changed, whereby the set current difference ΔIset is changed thereby to change sensitivity for detecting the touching between the lower face 204a of the air pressure driving source 204 and upper face 422a of the part 422. Accordingly, the touching of the lower face 204a and upper face 422a of the part 422 can be detected even if, for instance, the placing face 421 is soft or the part 422 is easily broken and only a minute current change is obtained. A wrong detection is thus prevented and the part 422 can be taken out stably from the part feed section 7.

Since the chucking mechanism part 201 moves at the second speed before touching with the part 422, the chucking mechanism-part 201 makes a soft contact to the part 422, making it possible to eliminate a mechanism for absorbing shocks at the time of touching. Thus the chucking mechanism part 201 is light-weight and accordingly increased in operation speed. The part 422 is consequently mounted at high speed.

In the embodiment as above, the touching of the lower face 204a of the air pressure driving source 204 and the upper face 422a of the part 422 is detected from the current change of the voice coil motor. The detection is not limited to this way. For example, a pressure sensor such as a load cell or the like may be fitted to the lower face 204a of the air pressure driving source 204 and the touching is detected based on an output of the pressure sensor.

Figure 7:
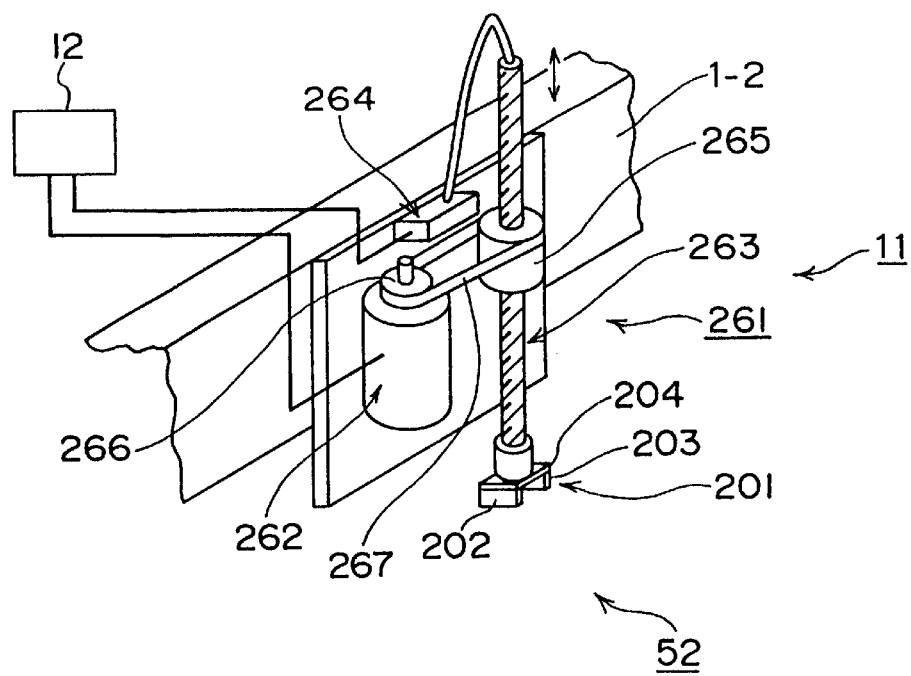
FIG. 7 is a perspective view of a driving part of a chucking device according to a different embodiment which is capable of carrying out the method of FIG. 1.

The driving part 251 is constituted of the voice coil motor in the foregoing embodiment. A driving part 261 constituting a chucking device 11 as shown in FIG. 7 is also employable. FIG. 7 shows only the vicinity of the chucking device 2 of FIG. 5, without other components. A part mounting apparatus 52 of FIG. 7 is provided with a chucking control device 12 in place of the chucking control, device 5 of FIG. 5.

The driving part 261 is constituted as follows. The driving part 261 is provided with a servo motor 262, a ball screw 263 having the chucking mechanism part 201 at one end part thereof, and a solenoid valve 264 for feeding and discharging air to the air pressure driving source 204 of the chucking mechanism part 201. A nut part 265 is set to the ball screw 263, which is engaged with the ball screw 263 and rotates in a circumferential direction of the ball screw 263 about a center axis of the ball screw 263. A belt 267 is hung between a pulley 266 attached at an output shaft of the servo motor 262 and the nut part 265, so that the nut part 265 is rotated in the circumferential direction of the ball screw 263 in accordance with the operation of the servo motor 262. Since the nut part 265 is set to the Y guide part 1-2 in an immobile state to the Y guide part 1-2 of the XY robot 1, the ball screw 263 engaged with the nut part 265 can move up and down in the Z-direction when the nut part 265 rotates, and the chucking mechanism part 201 moves up and down in the Z-direction. The operation of the chucking control device 12, particularly, the servo motor 262 is controlled by a digital servo driver.

The mounting apparatus 52 of the above constitution mounts parts fundamentally in the same manner as the earlier described part mounting apparatus 51. Only a difference will be depicted below. That is, a value of a torque of the servo motor 262 fed back to the digital servo driver (referred to as "a torque feed back value") is measured in the mounting apparatus 52 in steps 6 and 7, not the value of the current supplied to the driving part 251.

Even when the torque feed back value as one of internally processed data in the digital servo driver is used, the part 422 is held stably regardless of the error in set position of the placing face 421 in the movement direction of the chucking mechanism part 201, irregularity in height size of the part 422 in the movement direction of the chucking mechanism part 201, strength of the tray 423 or the like of the part feed section 7, etc.

Moreover, the mounting apparatus 52 employs the driving part of the chucking mechanism part 201 of a type equipped with the servo motor 262 and ball screw 263 and can hence be applied to the method of the present embodiment without changing the constitution of the conventional apparatus large. The method carried out in the mounting apparatus 52 is accordingly an effective means to existing facilities as well.

The holding plates 202, 203 are opened and closed by the air pressure in the above part mounting apparatus 51, 52. An electromagnetic actuator utilizing a solenoid or the like may be used for the purpose.

The mounting apparatus 52 uses the ball screw 263 as a driving mechanism for the chucking mechanism part 201. The kind of the driving mechanism is not limited so long as it converts a rotary movement to a linear movement without deteriorating conversion efficiency for a force large.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of mounting a part onto a body, comprising:
    moving a part holding member in a vertical direction at a first speed from an initial position to a part vicinal position located above an upper surface of a part positioned on a part supporting surface, a distance between the part vicinal position and the upper surface of the part being equal to a sum of a vertical set positional error of the part supporting surface and a height dimension error of the height of the part;
    moving the part holding member in a vertical direction at a second speed from the part vicinal position to a contact position whereat the part holding member contacts the part on the part supporting surface, the second speed being slower than the first speed;
    stopping a movement of the part holding member when the part holding member contacts the part on the part supporting surface; and
    holding the part using the part holding member after said stopping of the movement of the part holding member;
    wherein said moving of the part holding member is performed by a driving part driven by electric current, wherein when an amount of the electric current for driving the driving part reaches a threshold value, a determination is made that the part holding member has contacted the part so that the movement of the part holding member is stopped, the amount of electric current being measured after a current stabilization duration is complete, the current stabilization duration being an amount of time for the electric current fed to the driving part to stabilize.

2. The method of claim 1, wherein the part holding member comprises a chucking mechanism for holding the part, the chucking mechanism including a lower face, said moving of the part holding member at the second speed comprising moving the part holding member in the vertical direction at the second speed until the lower face of the chucking mechanism contacts the upper surface of the part.

3. The method of claim 1, further comprising determining that the part is not present on the part supporting surface if the part holding member moves in the vertical direction to a preset lower position without contacting the part, wherein the preset lower position is lower than the contact position.

4. The method of claim 1, wherein the threshold value is a set value based on a state of the part supporting surface.

5. The method of claim 4, further comprising determining that the part is not present on the part supporting surface if the part holding member moves in the vertical direction to a preset lower position without contacting the part, wherein the preset lower position is lower than the contact position.

6. The method of claim 1, wherein said moving of the part holding member in the vertical direction at the second speed comprises moving the part holding member in the vertical direction from the part vicinal position to a lower position; and
    said stopping of the movement of the part holding member comprises stopping the movement of the part holding member when the part holding member contacts the part as the part holding member is moved from the part vicinal position to the lower position.

7. The method of claim 6, further comprising determine that the part is not present on the part supporting surface if the part holding member moves in the vertical direction to the lower position without contacting the part.

8. An apparatus for mounting a part onto a body, comprising:
    a part holding member adapted to be moved in a vertical direction to pick up a part positioned on a part supporting surface and to hold the part;
    a control device adapted to:
        control said part holding member so as to move said part holding member in a vertical direction at a first speed from an initial position to a part vicinal position located above an upper surface of the part on the part supporting surface, a distance between the part vicinal position and the upper surface of the part being equal to a sum of a vertical set positional error of the part supporting surface and a height dimension error of the height of the part;
        control said part holding member so as to move said part holding member in a vertical direction at a second speed from the part vicinal position to a contact position whereat said part holding member contacts the part on the part supporting surface, the second speed being slower than the first speed;
        control said part holding member so as to stop a movement of said part holding member when said part holding member contacts the part on the part supporting surface; and
        control said part holding member so that said part holding member holds the part after the movement of said part holding member is stopped by said control device; and
    a driving part driven by electric current for moving said part holding member, said control device being adapted to determine that said part holding member has contacted the part so as to stop the movement of the part holding member by detecting when an amount of the electric current for driving said driving part reaches a threshold value, said control device being adapted to measure the amount of electric current after a current stabilization duration is complete, the current stabilization duration being an amount of time for the electric current fed to said driving part to stabilize.

9. The apparatus of claim 8, wherein said control device is adapted to determine that the part is not present on the part supporting surface if said part holding member moves in the vertical direction to a preset lower position without contacting the part, wherein the preset lower position is lower than the contact position.

10. The apparatus of claim 8, wherein the threshold value is a set value based on a state of the part supporting surface.

11. The apparatus of claim 10, wherein said control device is adapted to determine that the part is not present on the part supporting surface if said part holding member moves in the vertical direction to a preset lower position without contacting the part, wherein the preset lower position is lower than the contact position.

12. The apparatus of claim 8, wherein said part holding member comprises a chucking mechanism for holding the part, said chucking mechanism including a lower face, said control device being adapted to move said part holding member at the second speed until said lower face of said chucking mechanism contacts the upper surface of the part.

13. The apparatus of claim 8, wherein said control device is adapted to move said part holding member in the vertical direction at the second speed from the part vicinal position to a lower position; and said control device is adapted to stop the movement of said part holding member when said part holding member contacts the part as the part holding member is moved from the part vicinal position to the lower position.

14. The apparatus of claim 13, wherein said control device is adapted to determine that the part is not present on the part supporting surface if said part holding member moves in the vertical direction to a preset lower position without contacting the part, wherein the preset lower position is lower than the contact position.

\* \* \* \* \*